United States Patent
Kim et al.

(10) Patent No.: US 10,880,813 B2
(45) Date of Patent: Dec. 29, 2020

(54) METHOD FOR PROCESSING ACCESS REQUEST FROM UE, AND NETWORK NODE

(71) Applicant: LG Electronics Inc., Seoul (KR)

(72) Inventors: Hyunsook Kim, Seoul (KR); Sangmin Park, Seoul (KR); Myungjune Youn, Seoul (KR); Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/091,734

(22) PCT Filed: Apr. 3, 2017

(86) PCT No.: PCT/KR2017/003623
§ 371 (c)(1),
(2) Date: Oct. 5, 2018

(87) PCT Pub. No.: WO2017/176013
PCT Pub. Date: Oct. 12, 2017

(65) Prior Publication Data
US 2019/0159107 A1 May 23, 2019

Related U.S. Application Data

(60) Provisional application No. 62/337,343, filed on May 17, 2016, provisional application No. 62/318,229, filed on Apr. 5, 2016.

(51) Int. Cl.
*H04W 48/04* (2009.01)
*H04W 8/02* (2009.01)
(Continued)

(52) U.S. Cl.
CPC ............ *H04W 48/04* (2013.01); *H04W 8/02* (2013.01); *H04W 12/06* (2013.01); *H04W 48/18* (2013.01); *H04W 60/00* (2013.01); *H04W 60/06* (2013.01)

(58) Field of Classification Search
None
See application file for complete search history.

(56) References Cited

U.S. PATENT DOCUMENTS

2017/0142591 A1* 5/2017 Vrzic ................ H04W 24/08
2017/0289791 A1* 10/2017 Yoo .................. H04W 76/11
(Continued)

FOREIGN PATENT DOCUMENTS

| KR | 1020100058632 | 6/2010 |
|---|---|---|
| KR | 101127964 | 4/2012 |

(Continued)

OTHER PUBLICATIONS

International Search Report in International Application No. PCT/KR2017/003623, dated Jul. 7, 2017, 6 pages.
(Continued)

*Primary Examiner* — Michael J Moore, Jr.
(74) *Attorney, Agent, or Firm* — Fish & Richardson P.C.

(57) ABSTRACT

A disclosure of the present specification provides a method in which a network node processes an access request from a user equipment (UE). The method may comprise the steps of: receiving an access request message from a UE; and selecting a control plane (CP) function node on the basis of information associated with the UE, in response to the access request message. Here, the selected CP function node may perform a common or basic function, which is shared among slice instances of a network. Each slice instance may include a service-specific or non-common CP function node, which is not shared with other slice instances. The method
(Continued)

may include a step of transferring the access request message to the selected CP function node.

12 Claims, 10 Drawing Sheets

(51) Int. Cl.
*H04W 60/06* (2009.01)
*H04W 60/00* (2009.01)
*H04W 48/18* (2009.01)
*H04W 12/06* (2009.01)

(56) References Cited

U.S. PATENT DOCUMENTS

| | | | |
|---|---|---|---|
| 2018/0048465 A1* | 2/2018 | Schliwa-Bertling | ............................ G11B 20/0021 |
| 2018/0376446 A1* | 12/2018 | Youn | .................... H04W 68/005 |
| 2019/0020996 A1* | 1/2019 | Zhang | ...................... H04W 8/14 |
| 2019/0029075 A1* | 1/2019 | Wang | .............. H04W 12/00514 |
| 2019/0037409 A1* | 1/2019 | Wang | ...................... H04W 28/06 |
| 2019/0124508 A1* | 4/2019 | Watfa | ...................... H04W 8/02 |

FOREIGN PATENT DOCUMENTS

| | | |
|---|---|---|
| WO | WO2012064076 | 5/2012 |
| WO | WO2015037882 | 3/2015 |
| WO | WO2015070892 | 5/2015 |

OTHER PUBLICATIONS

Extended European Search Report in European Application No. 17779313.0, dated Oct. 15, 2019, 15 pages.
Ericsson, "RAN support for network slicing," R3-160847, TSG-RAN WG3 Meeting #91, dated Bengalore, India, Apr. 10-15, 2016, 3 pages.
Huawei, "Add use case of possible network slice creation methods with shared NFs," S5-166383, 3GPP TSG SA WG5 (Telecom Management) Meeting #110, Reno, USA, dated Nov. 14-18, 2016, 3 pages.
LG Electronics, "Initial network slice instance selection (update of solution 1.3)," S2-162627, SA WG2 Meeting #115, P.R. China, dated May 23-27, 2016, 6 pages.
LG Electronics, "Solution on Key issue #1: Support of multiple sessions via multiple Core Network Slices," S2-161541, SA WG2 Meeting #114, Sophia Antipolis, France, dated Apr. 11-15, 2016, 5 pages.
LG Electronics, "Solution on Network slice instance re-selection," S2-161628, SA WG2 Meeting #115, P.R. China, dated May 23-27, 2016, 3 pages.
3rd Generation Partnership Project; Technical Specification Group Services and System Aspects; "Study on Architecture for Next Generation System (Release 14)," 3GPP TR 23.799 V0.3.0, dated Mar. 2016, 52 pages.
NEC, "Solution: shared and dedicated network functions for network slicing," S2-161785, SA WG2 Meeting #114, Sophia Antipolis, dated Apr. 11-15, 2016, 3 pages.
Nokia Networks, Alcatel-Lucent, "Solution: Network Slicing," S2-161326, SA WG2 Meeting #S2-113ah, Sophia Antipolis, dated Feb. 23-26, 2016, 4 pages.

* cited by examiner

METHOD FOR PROCESSING ACCESS REQUEST FROM UE, AND NETWORK NODE

CROSS-REFERENCE TO RELATED APPLICATIONS

This application is a National Stage application under 35 U.S.C. § 371 of International Application No. PCT/KR2017/003623, filed on Apr. 3, 2017, which claims the benefit of U.S. Provisional Application No. 62/337,343, filed on May 17, 2016, and U.S. Provisional Application No. 62/318,229, filed on Apr. 5, 2016. The disclosures of the prior applications are incorporated by reference in their entirety.

BACKGROUND OF THE INVENTION

Field of the Invention

The present invention relates to a next generation mobile communication.

Related Art

Thanks to the success of the Long Term Evolution (LTE)/LTE-Advanced (LTE-A) for the 4-th generation mobile communication, interest for future mobile communication, namely 5-th mobile communication is getting higher, and researches on the 5-th mobile communication are started one after another.

It is expected that in the next generation mobile communication, namely the 5-th mobile communication, data services with a minimum speed of 1 Gbps will be realized. These high-speed services seem to be difficult to be accommodated by the core network designed for the conventional LTE/LTE-A.

Therefore, redesign of the core network is urgently required in the so-called fifth generation mobile communication.

FIG. 1a illustrates an expected structure of the next-generation mobile communication from the viewpoint of a node.

As may be seen with reference to FIG. 1a, a UE may access the core network through a next-generation Radio Access Network (RAN). The next-generation core network may include a control plane (CP) function node and a user plane (UP) function node. The CP function node, which is a node for managing UP function nodes and RAN, transmits and receives a control signal. The CP function node performs all or part of the functions of a Mobility Management Entity (MME) in the fourth generation mobile communication; and all or part of the control plane functions of a Serving Gateway (S-GW) and a PDN Gateway (P-GW). The UP function node is a kind of gateway through which user data are transmitted and received. The UP function node may perform all or part of the user plane functions of the S-GW and the P-GW in the fourth generation mobile communication.

The Policy Control Function (PCF) in the figure is a node for controlling the policies of a service provider. And the subscriber information server shown stores subscription information of a user.

FIG. 1b illustrates an expected structure of the next-generation mobile communication from the viewpoint of a session.

As shown in the figure, the core network is divided into a control plane (CP) and a user plane (UP). The control plane (CP) may include a policy control function (PCF), a subscriber information server, and a CP node which performs session management (SM). And the user plane (UP) may include a UP function node. The nodes within the control plane (CP) are implemented through cloud virtualization. And so are the nodes within the user plane (UP).

The UE may request creation of a session directed to a data network (DN) through an access network (AN). The session may be created and managed by the CP node for session management (SM). At this time, the session management may be performed according to the information stored in the subscriber information server and the policies (for example, a QoS management policy) of a service provider stored within the policy control function (PCF) entity. In other words, if receiving a request for creation/modification/release of a session from the UE, the CP node for session management (SM) obtains the information through interaction with the subscriber information server and the policy control function (PCF) and creates/modifies/releases the session. Also, the CP node for session management (SM) selects a UP function node for the session and allocates resources of the core network. Also, the CP node for session management (SM) may allocate an IP address directly to the UE or request the UP function node to allocate an IP address to the UE.

SUMMARY OF THE INVENTION

A specific network structure for the next-generation mobile communication has not been proposed so far.

Therefore, the present specification is disclosed to propose not only the network architecture for the next-generation mobile communication but also an operating procedure for the next-generation mobile communication.

To achieve the foregoing purposes, the disclosure of the present specification proposes a method for processing an access request from a UE. The method may be performed by a network node and comprise: receiving an access request message from a UE; and selecting a control plane (CP) function node on the basis of information associated with the UE, in response to the access request message. The selected CP function node may perform a common or basic function, which is shared among slice instances of a network. Each slice instance includes a service-specific or non-common CP function node, which is not shared with other slice instances. The method may comprise: transmitting the access request message to the selected CP function node.

The information associated with the UE may include one or more of use type information of the UE and information about the type of a service.

The method may further comprise: if it is not possible to select the CP function node, requesting the selection from a different node by the network node.

The access request message may be an attach request message.

The method may further comprise: receiving a re-access request message from the UE, wherein the re-access request message is transmitted from the UE according to change of a slice instance; and reselecting a CP function node in response to the re-access request message.

The re-access request message may be a re-attach request message.

The method may further comprise: receiving a request message including a location update request message from the UE, wherein the location update request message is transmitted from the UE according as a slice instance is changed; and reselecting a CP function node in response to the request message.

The location update request message may be a Tracking Area Update (TAU) request message or a location registration request message.

The shared common or basic function may include one or more of a function for performing authentication of the UE and a function for managing mobility of the UE.

The service-specific or non-common CP function node may perform a function for managing a session of the UE.

To achieve the foregoing purposes, the disclosure of the present specification proposes a network node for processing an access request of a UE. The network node may comprise: a receiving unit configured to receive an access request message from a UE; a processor configured to select a control plane (CP) function node on the basis of information associated with the UE, in response to the access request message. The selected CP function node may perform a common or basic function, which is shared among slice instances of a network. Each slice instance may include a service-specific or non-common CP function node, which is not shared with other slice instances. The network node may comprise: a transceiver configured to transmit the access request message to the selected CP function node.

According to the disclosure of the present specification, architecture and an operating procedure for the next-generation mobile communication are proposed. According to the procedure disclosed in the present specification, a session may be managed more efficiently.

DESCRIPTION OF EXEMPLARY EMBODIMENTS

Figure 1A:
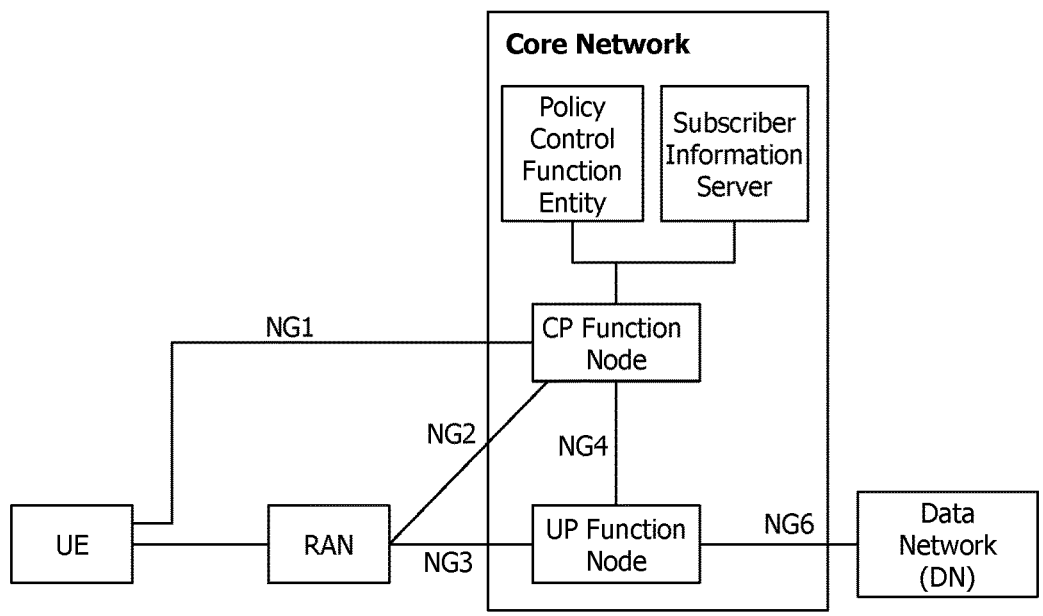
FIG. 1a illustrates an expected structure of the next-generation mobile communication from the viewpoint of a node.
Figure 1B:
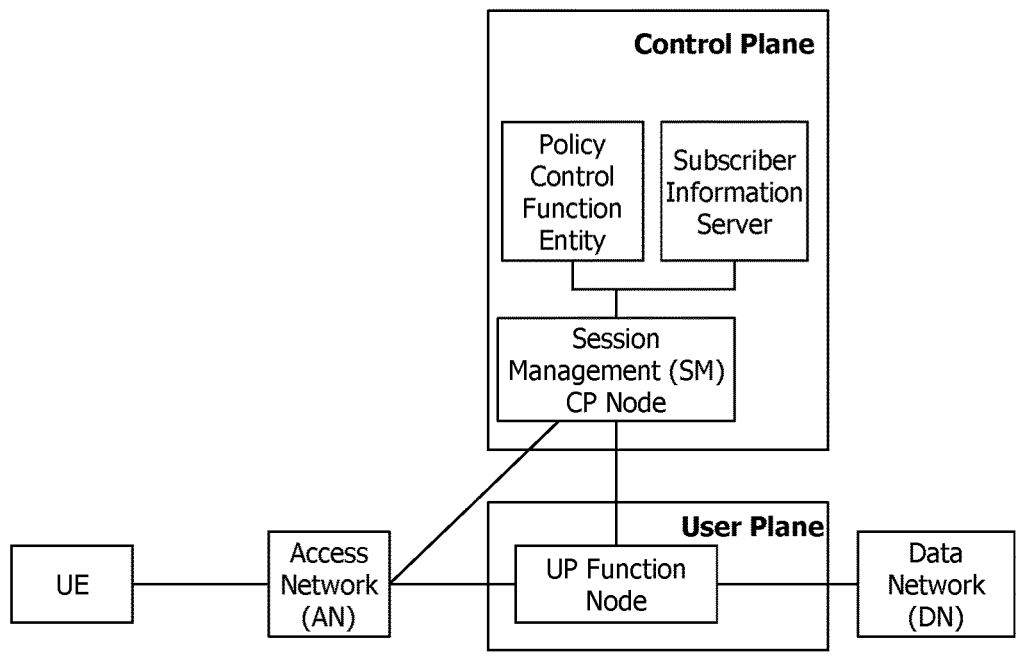
FIG. 1b illustrates an expected structure of the next-generation mobile communication from the viewpoint of a session.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply. The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN.

Requested service or a network (PDN) is accessed via P-GW. An APN is a name (a character string, e.g., 'internet.mnc012.mcc345.gprs') previously defined within a network so that the P-GW can be searched for.

APDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

Figure 2:
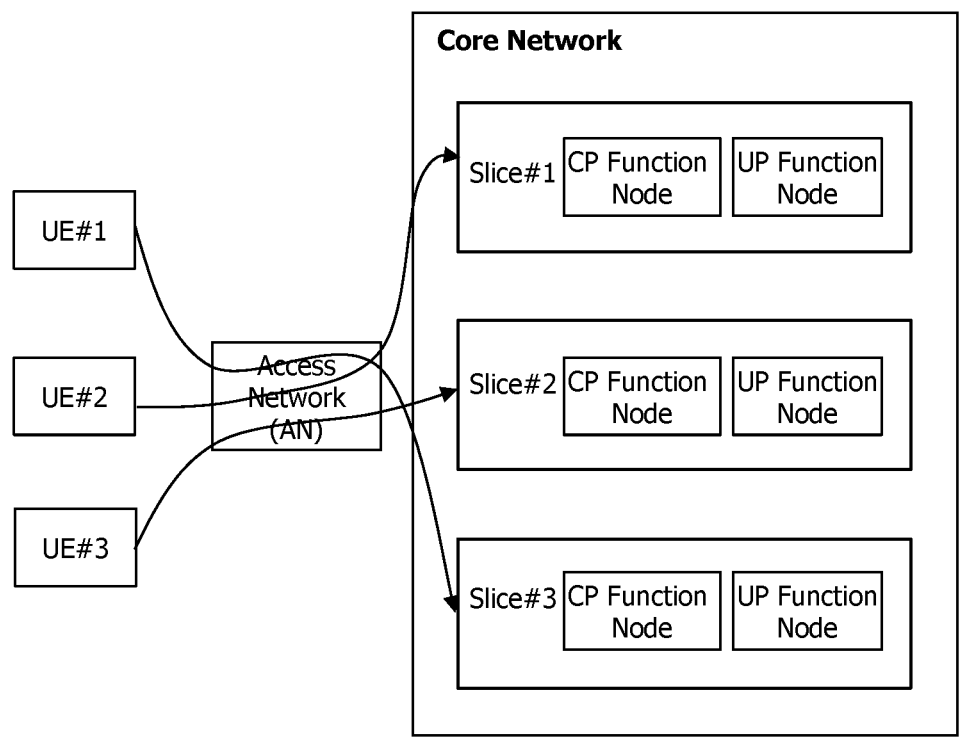
FIG. 2 illustrates an example of architecture for implementing network slicing.

FIG. 2 illustrates an example of architecture for implementing network slicing.

As may be noticed with reference to FIG. 2, the core network (CN) may be divided into several slice instances. Each slice instance may include one or more of a CP function node and a UP function node.

Each UE may use a network slice instance relevant to its service through the access network (AN).

Different from FIG. 2, each slice instance may share one or more of the CP function node and the UP function node with other slide instance. This feature will be described with reference to FIG. 3 below.

Figure 3:
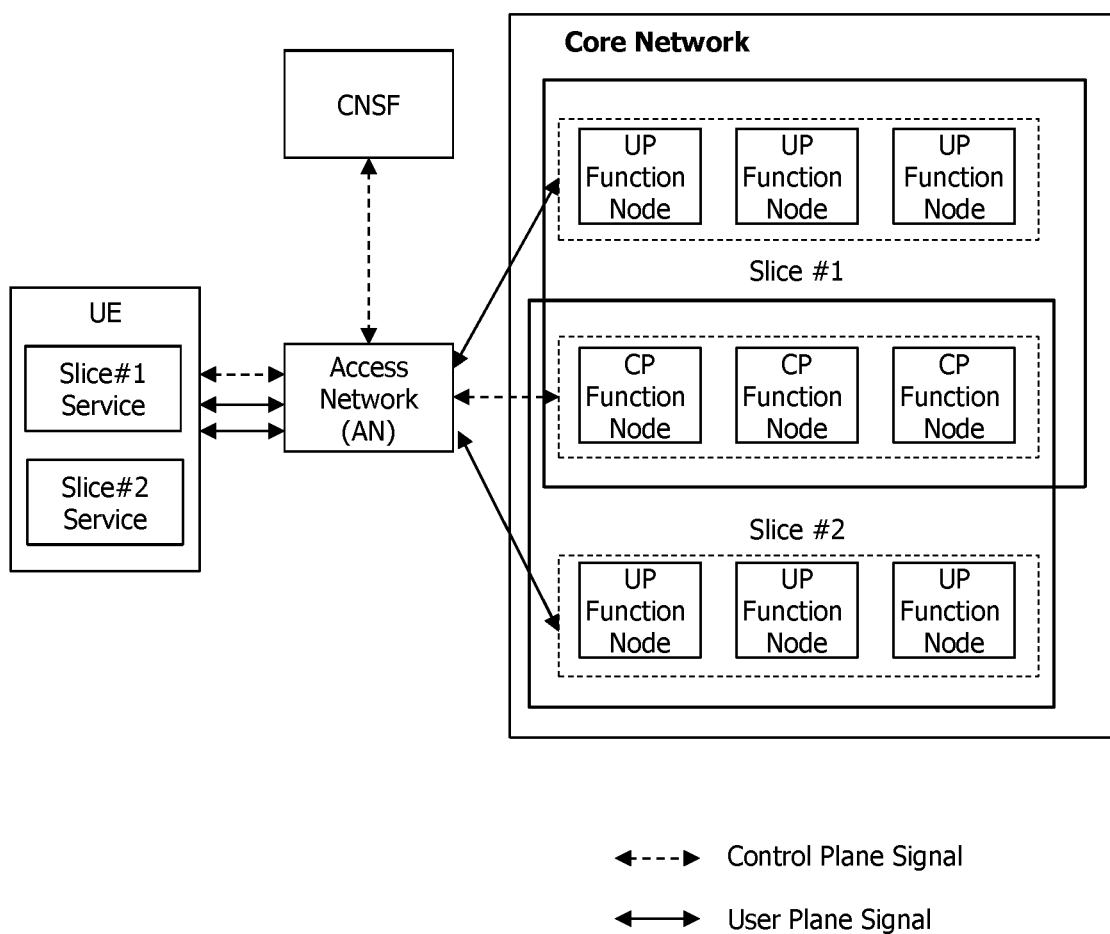
FIG. 3 illustrates another example of the architecture for implementing network slicing.

FIG. 3 illustrates another example of the architecture for implementing network slicing.

Referring to FIG. 3, a plurality of UP function nodes are clustered, and a plurality of CP function nodes are also clustered.

And referring to FIG. 3, slice instance #1 within the core network (which is also called instance #1) includes a first cluster of UP function nodes. And the slice instance #1 shares the cluster of CP function nodes with slice #2 (which is also called instance #2). The slice instance #2 includes a second cluster of UP function nodes.

The Core Network Selection Function (CNSF) shown in the figure selects a slice (or instance) capable of accommodating a service of the UE.

The UE in the figure may use the service #1 through the slice instance #1 selected by the CNSF and also use the service #2 through the slice instance #2 selected by the CNSF.

So far, the concept of network slicing has been described. It should be noted, however, that a specific method for realizing the network slicing concept has not been proposed yet. Moreover, considering actual implementation and commercialization of the network slicing concept, architecture for network slicing needs to be improved and optimized further. Also, in order for a UE to receive a plurality of services through a plurality of slice instances, a method for creating and managing a plurality of sessions is needed.

DISCLOSURES OF THE PRESENT SPECIFICATION

In what follows, the architecture proposed by the present specification and a procedure performed under the corresponding architecture will be described.

I. First Disclosure of the Present Specification

According to the first disclosure of the present specification, to enable a UE to use a plurality of services simultaneously through a plurality of network slice instances from one network service provider, an architecture which enables a set (or cluster) of CP control nodes to be shared among several slice instances is proposed. The proposed architecture will be described with reference to FIG. 4 below.

Figure 4:
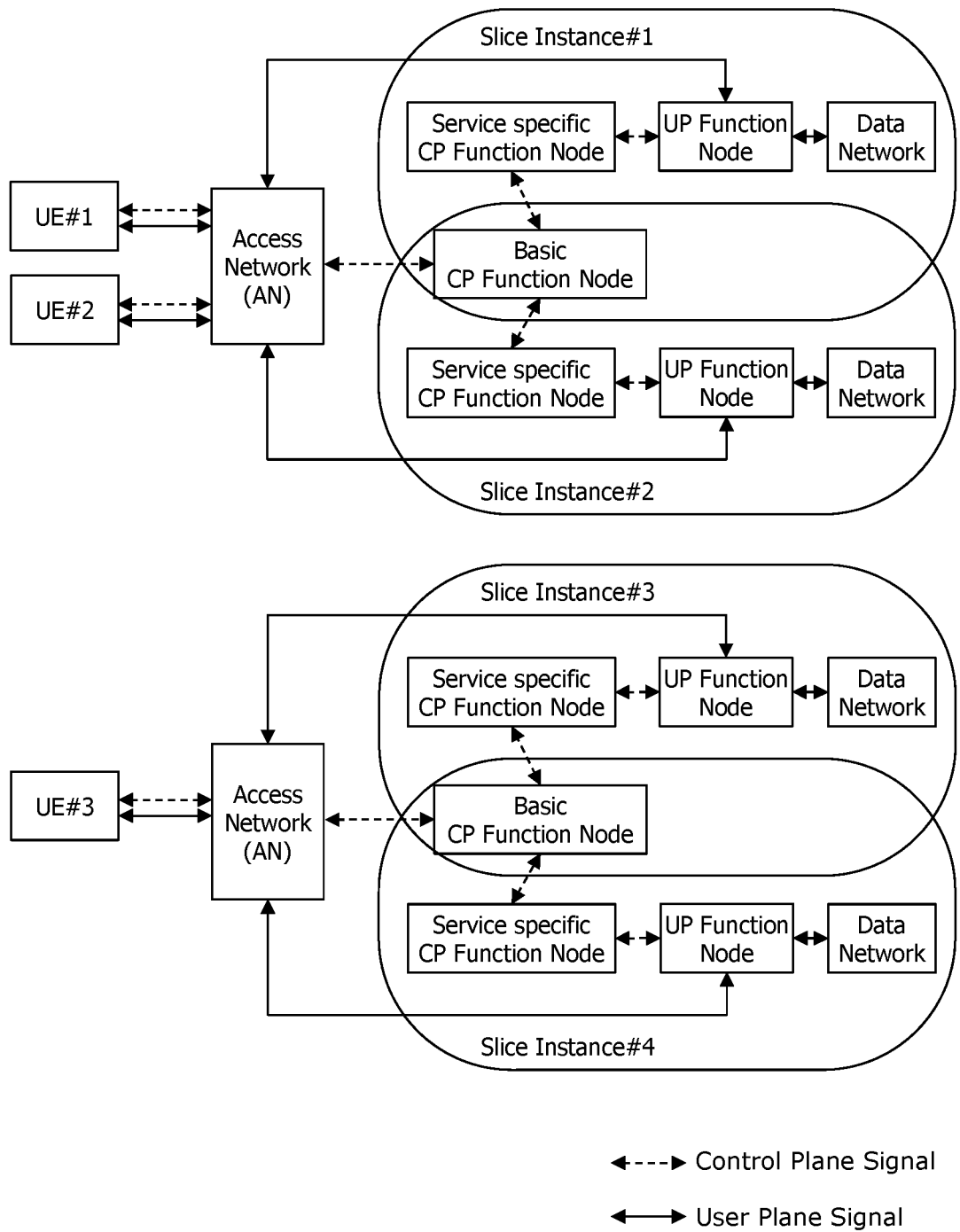
FIG. 4 illustrates an architecture for implementing network slicing according to a first disclosure of the present specification.

FIG. 4 illustrates an architecture for implementing network slicing according to a first disclosure of the present specification.

As may be seen from FIG. 4, a basic CP function node may be shared among slice instances so that each UE may use a service through a plurality of slice instances.

Each slice instance may include a service-specific CP function node, UP function node, and basic CP function node which may be shared with other slice instance.

A plurality of service-specific CP function nodes may be grouped into one cluster (or a set). In the same way, a plurality of UP function nodes may be grouped into one cluster (or a set).

Each slice instance may be dedicated to the UEs of the same type.

The basic CP function node may allow a UE to enter the network by performing authentication and subscription verification. Moreover, the basic UP function node may manage mobility of the UE according to characteristics of the mobility (for example, low or high mobility).

The service-specific CP function node manages a session.

Meanwhile, when a UE accesses the network for the first time, the basic CP function node is selected within the access network (AN). The selection may be performed according to the information of the UE (for example, use type of the UE).

If the UE makes a session request when performing an initial attach or after performing the attach, a slice instance selection function may be triggered within the core network to select a service-specific CP function node and an UP function node. This selection may be performed on the basis of subscriber information and information related to a session request from the UE (for example, the type of a requested service or information such as APN).

If selection of the service-specific CP function node and the UP function node is set as the default within the core network, the selection may be performed even if there is no session request from the UE. At this time, if there exists a network slice instance set as the default, the instance is assigned to the UE.

The UE may have a plurality of sessions through one or a plurality of slice instances. If the UE requests a session, a node performing a slice selection function determines which slice instance to support the session requested by the UE. A slice instance determined is assigned for the session.

Meanwhile, the UE may be connected to a plurality of slice instances through different basic CP function nodes.

Moreover, the core network may determine to change the basic CP function node for the UE due to various reasons (for example, a network management problem, change of subscription information of the UE, or location change of the UE). To this end, the core network may request detach/reattach for the UE. If the UE accesses the network again in response to the request, the access network may select a different basic CP function node.

Figure 5:
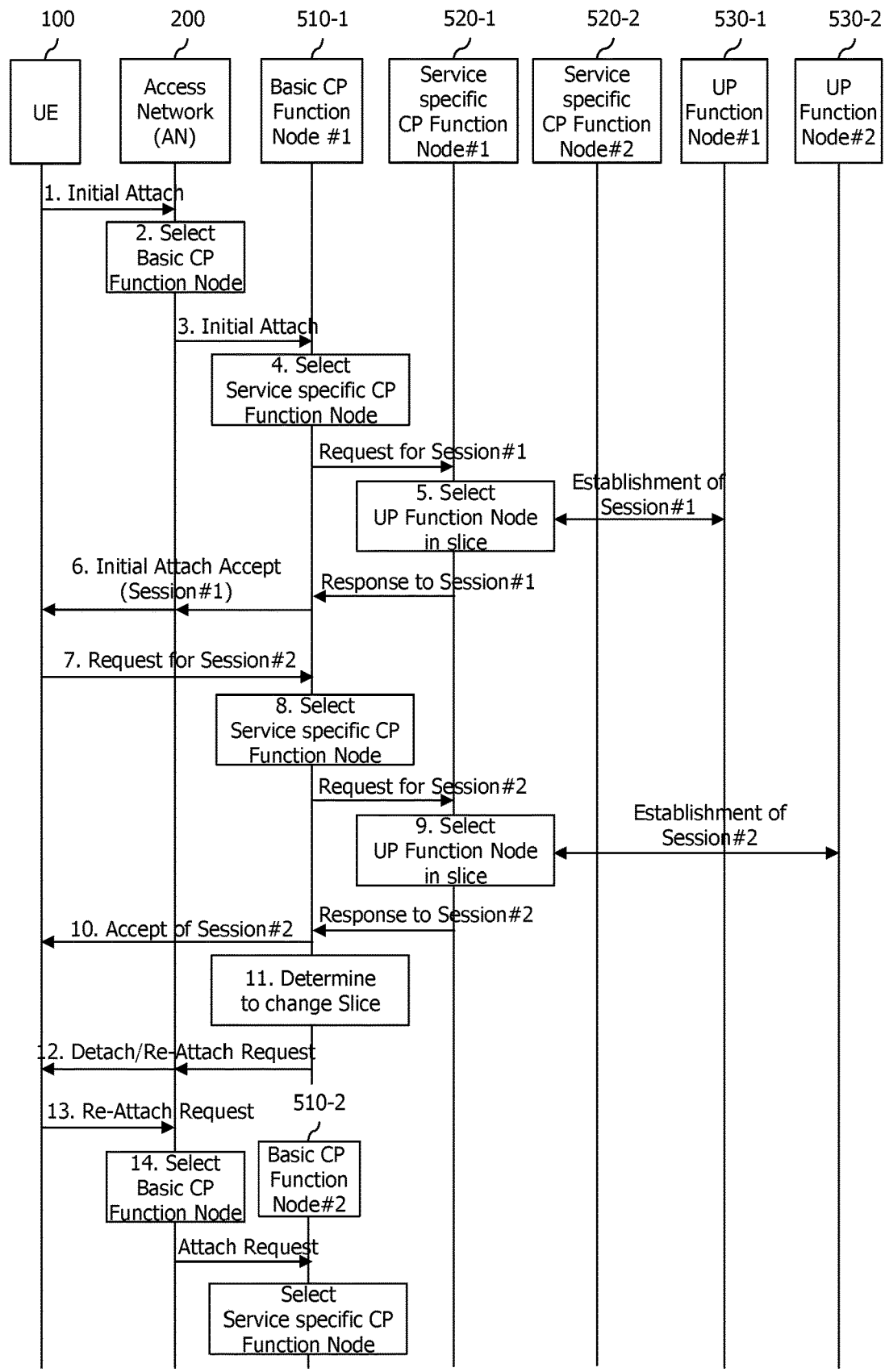
FIG. 5 illustrates a procedure for allocating a plurality of slice instances under the architecture shown in FIG. 4.

FIG. 5 illustrates a procedure for allocating a plurality of slice instances under the architecture shown in FIG. 4.

1) Referring to FIG. 5, the UE 100 first transmits an attach request message to perform initial attach to the network.

2) Then, the access network (AN) 200 selects the slice instance #1 by using the information included in the attach request message from the UE and selects the basic CP function node #1 510-1 for the selected slice instance #1. Here the information may be related to the request. The information related to the request may include information about the use type of the UE or information about the type of a service requested by the UE, for example. The information about the use type of the UE may indicate whether the UE is a UE intended for an ordinary user, a UE for Machine Type Communication (MTC), or a UE for Vehicle-to-Vehicle (V2V) communication.

3) And the AN 200 transmits an attach request message to the selected basic CP function node #1 510-1.

4) Then, the basic CP function node #1 510-1 selects a service-specific CP function node 520-1. And when it is required to create the session #1 while the initial attach procedure is performed, the basic CP function node #1 510-1 transmits a session creation request message to the selected service-specific CP function node #1 520-1. This process may be performed on the basis of subscriber information of the UE and information about the session creation request (for example, information about a requested service and information such as APN).

5) The service-specific CP function node #1 520-1 selects the UP function node #1 530-1 within the slice instance #1. And the service-specific CP function node #1 520-1 transmits a session creation message to create the session #1 to the selected UP function node #1 530-1. When creation of the session #1 is completed, the service-specific CP function node #1 520-1 transmits a session creation response message to the basic CP function node #1 510-1.

6) Then when recognizing completion of creation of the session #1 through the session creation response message, the basic CP function node #1 510-1 transmits an attach accept message to the UE. The initial attach accept message includes information about the created session #1.

7) Meanwhile, the UE 100 transmits a session creation request message to the basic CP function node #1 510-1 to create the session #2 additionally.

8) The basic CP function node #1 510-1 determines whether a different slice instance #2 has to be allocated for the requested session #2. For example, suppose the user of the UE gets into a vehicle while performing normal communication through the session #1 of the slice instance #1 and requests the session #2 for V2V communication. In this case, the slice instance #2 has to be allocated for the session #2 for vehicle-to-vehicle (V2V) communication.

If the different slice instance has to be allocated for the session #2, the basic CP function node #1 510-1 selects the service-specific CP function node #2 520-2 within the different slice instance. This process may be performed on the basis of subscriber information of the UE and information about the session creation request (for example, information about a requested service and information such as APN).

9) The selected service-specific CP function node #2 520-2 selects the UP function node #2 530-2 which supports the session #2 within the slice instance. And the service-specific CP function node #2 520-2 transmits a session creation request message to create the session #2 to the selected UP function node #2 530-3. When creation of the session #1 is completed, the service-specific CP function node #2 520-2 transmits a session creation response message to the basic CP function node #1 510-1.

10) Then when recognizing completion of creation of the session #2 through the session creation response message, the basic CP function node #1 510-1 transmits an attach creation accept message to the UE.

11) On the other hand, the basic CP function node #1 510-1 determines whether it is necessary to change the basic CP function node for the UE. The determination may be triggered by network management, change of subscriber information of the UE, location change of the UE, or change of service attributes of the UE. For example, when the UE changes to a KIA car while performing V2V communication in a Hyundai car, the basic CP function node may have to be changed to accommodate a V2V communication service of the KIA motors.

12) If the basic CP function node #1 510-1 determines to change the basic CP function node for the UE, the basic CP function node #1 transmits a detach/re-attach request message to the UE 100.

13) According to the detach request, the UE 100 releases access from the network and transmits a re-attach request message to access the network again.

14) Then the access network (AN) 200 selects a slice instance on the basis of the information included within the re-attach request message from the UE (for example, use type of the UE) and selects the basic CP function node #2 510-2 for the selected slice instance.

And the AN 200 transmits an attach or re-attach request message to the selected basic CP function node #2 510-2.

Then the basic CP function node #2 510-2 selects a service-specific CP function node.

II. Second Disclosure of the Present Specification

According to the second disclosure of the present specification, to enable a UE to use a plurality of services simultaneously through a plurality of network slice instances from one network service provider, an architecture which includes a common node (for example, C-CPF) is proposed. The proposed architecture will be described with reference to FIG. 6 below.

Figure 6:
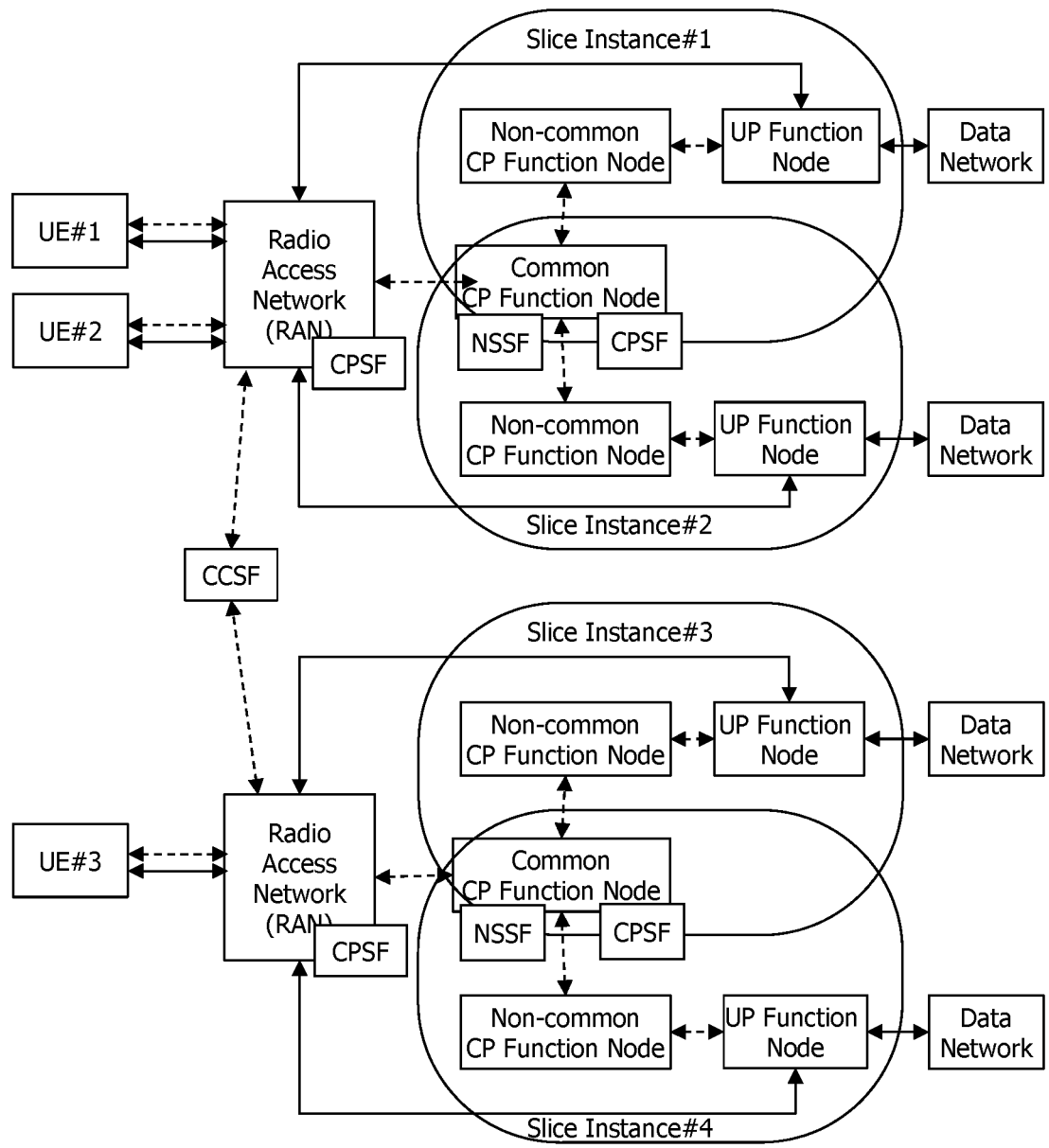
FIG. 6 illustrates an architecture for implementing network slicing according to a second disclosure of the present specification.

FIG. 6 illustrates an architecture for implementing network slicing according to a second disclosure of the present specification.

The second disclosure shown in FIG. 6 illustrates a Common Core network instance Selection Function (CCSF), Network Slice Selection Function (NSSF), and Control Plane Selection Function (CPSF).

The CCSF selects a common slice instance in the core network for providing a service to the UE. More specifically, the CCSF may select a common slice instance capable of supporting the UE by taking into account one or more of subscriber information of the UE and a specific parameter (for example, use type of the UE).

The NS SF selects a non-common slice instance in the core network for providing a service to the UE. More specifically, the NSSF may select a non-common slice instance capable of supporting the UE by taking into account one or more of the subscriber information of the UE and the specific parameter (for example, use type of the UE).

The CPSF selects a CP function node within the selected common slice instance with which an eNB has to communicate or selects a CP function node within the selected non-common slice instance. The selection may be performed by taking into account one or more of the specific parameters (for example, use type of the UE).

The common CP function may be shared among several slice instances. A plurality of common CP function nodes may be grouped to form one cluster (or a set).

The common CP function node allows the UE to enter the network by performing authentication and subscription verification. Moreover, the common CP function node may manage mobility of the UE according to characteristics of the mobility (for example, low or high mobility).

The UP function node may not be shared among several slice instances but may be included only within the corresponding slice instance. In the same manner, part of the CP function nodes may not be shared among slice instances but may be included only within the corresponding slice instance. This CP function node may be called a non-common CP function node.

The UP function node may provide a service to the UE and deliver the user plane data for the service. For example, the UP function node #1 within the slice instance #1 may provide an improved broadband service to the UE, and the UP function node #2 within the slice instance #2 may provide an important communication service to the UE.

Each slice instance may be dedicated to the UEs belonging to the same type. The type of the UE may be checked on the basis of the information about the use type of the UE and/or the information based on the subscriber information of the UE.

A non-common CP function node not common to the slice instances may be used only within the corresponding slice instance. This non-common CP function node may manage a session.

Each UE may have a plurality of connections of the user plane through various UP function nodes.

When the UE provides information to be used by a radio access network (RAN) node for routing a message of the UE to an appropriate slice instance and CP function node, the RAN node may select an object to which to route the message.

Figure 7:
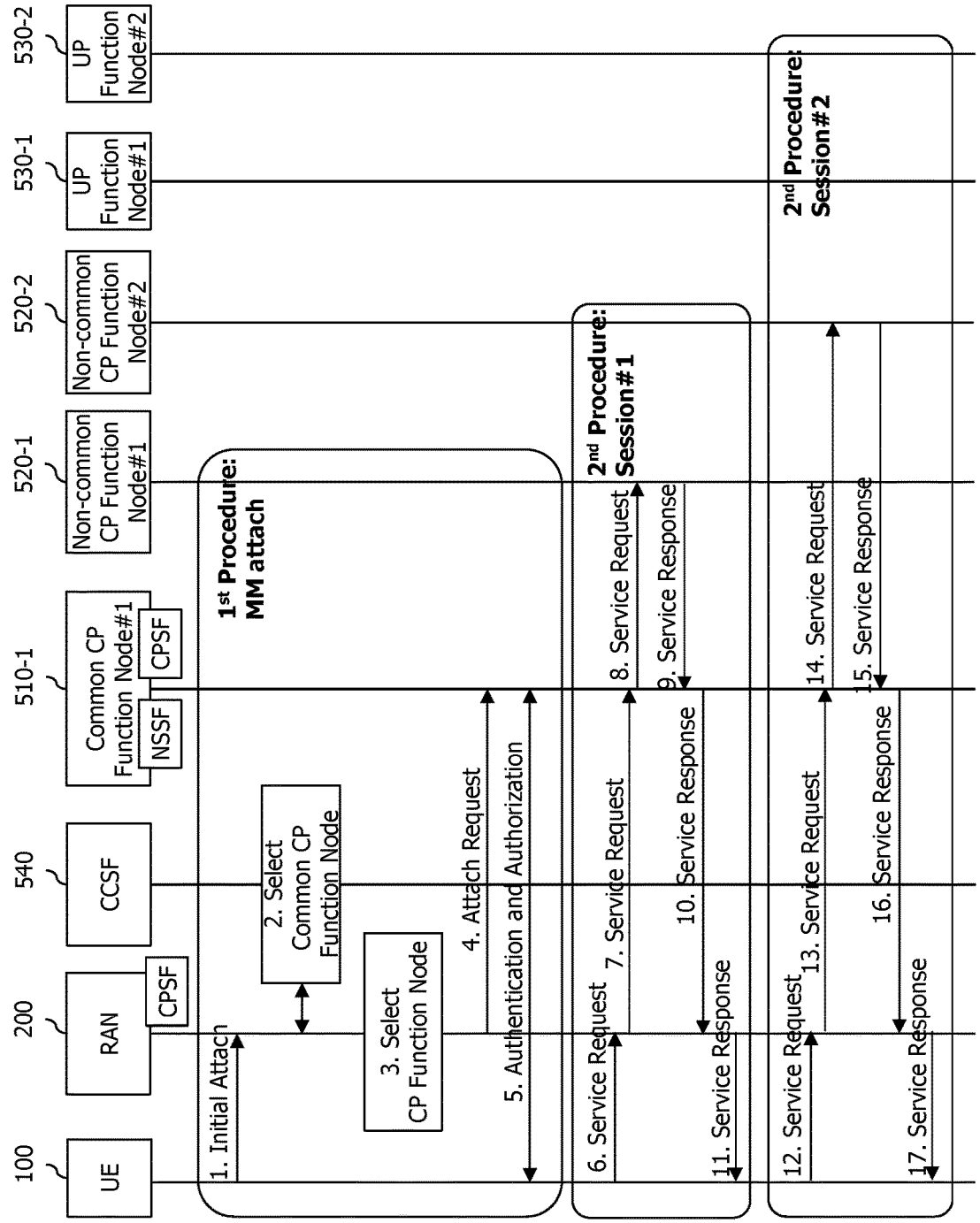
FIG. 7 illustrates a procedure for allocating a plurality of slice instances according to the architecture shown in FIG. 6.

FIG. 7 illustrates a procedure for allocating a plurality of slice instances according to the architecture shown in FIG. 6.

1) Referring to FIG. 7, the UE 100 first transmits an attach request message to perform initial attach to the network.

2) If the UE is unable to provide sufficient information for the radio access network (RAN) 200 to select a slice instance appropriate for routing the message and a common CP function node within the slice instance (namely the information related to the message such as the information about the use type of the UE or the information about the type of a service requested by the UE), the RAN 200 interacts with the CCSF 540.

The CCSF 540 selects an appropriate slice instance and a common CP function node by taking into account the information included in the message from the UE 100. For the selection, information within the subscriber information may be further taken into account. In the example of FIG. 7, it is assumed that the common CP function node #1 510-1 is selected. When the selection is completed, the CCSF 540 delivers the information about the result of the selection to the RAN 200.

3) Meanwhile, when the UE provides sufficient information, the RAN 200 may perform the selection directly.

4) When the selection is completed according to the step 2 or 3, the RAN 200 delivers the access request message (for example, the attach request message) to the common CP function node #1 510-1. Additional information may be delivered together with the attach request message.

5) Afterwards, the common CP function node #1 510-1 authenticates and authorizes the UE, after which the UE enters the network.

By doing so, the first phase, namely the attach procedure of Mobility Management (MM), is completed.

6) Meanwhile, the UE 100 transmits a service request message to the common CP function node #1 510-1 through the RAN 200 for the service #1.

7) The common CP function node #1 510-1 requests the NSSF to figure out which slice instance is capable of supporting the service #1. In the example of FIG. 7, it is assumed that the slice instance #1 is capable of supporting the service #1.

Also, after obtaining a response of the NSSF, the common CP function node #1 510-1 interacts with the CPSF and selects a non-common CP function node. In the example of FIG. 7, the non-common CP function node #1 520-1 within the slice instance #1 is selected.

8) Then, the common CP function node #1 510-1 delivers a service request message of the UE to the selected non-common CP function node #1 520-1. Along with the service request message, additional information may also be delivered.

The session #1 is created according to the service request.

9) When creation of the session is completed, the non-common CP function node #1 520-1 delivers a service response message to the common CP function node #1 510-1. The service response message may include information about the created session #1.

10-11) Then the common CP function node #1 510-1 delivers the service response message to the UE through the RAN 200.

12-13) Meanwhile, the UE 100 also transmits a service request message to the common CP function node #1 510-1 through the RNA 200 for the service #2.

14) The common CP function node #1 510-1 requests the NSSF to figure out which slice instance is capable of supporting the service #2. In the example of FIG. 7, it is assumed that the slice instance #2 is capable of supporting the service #2.

Also, after obtaining a response of the NSSF, the common CP function node #1 510-1 interacts with the CPSF and selects a non-common CP function node. In the example of FIG. 7, the non-common CP function node #2 520-2 within the slice instance #2 is selected.

Then, the common CP function node #1 510-1 delivers a service request message of the UE to the selected non-common CP function node #2 520-2. Along with the service request message, additional information may also be delivered.

The session #2 is created according to the service request.

Since subsequent procedures are similar to those given with respect to the session #1, descriptions of the subsequent procedures will not be repeated.

Figure 8:
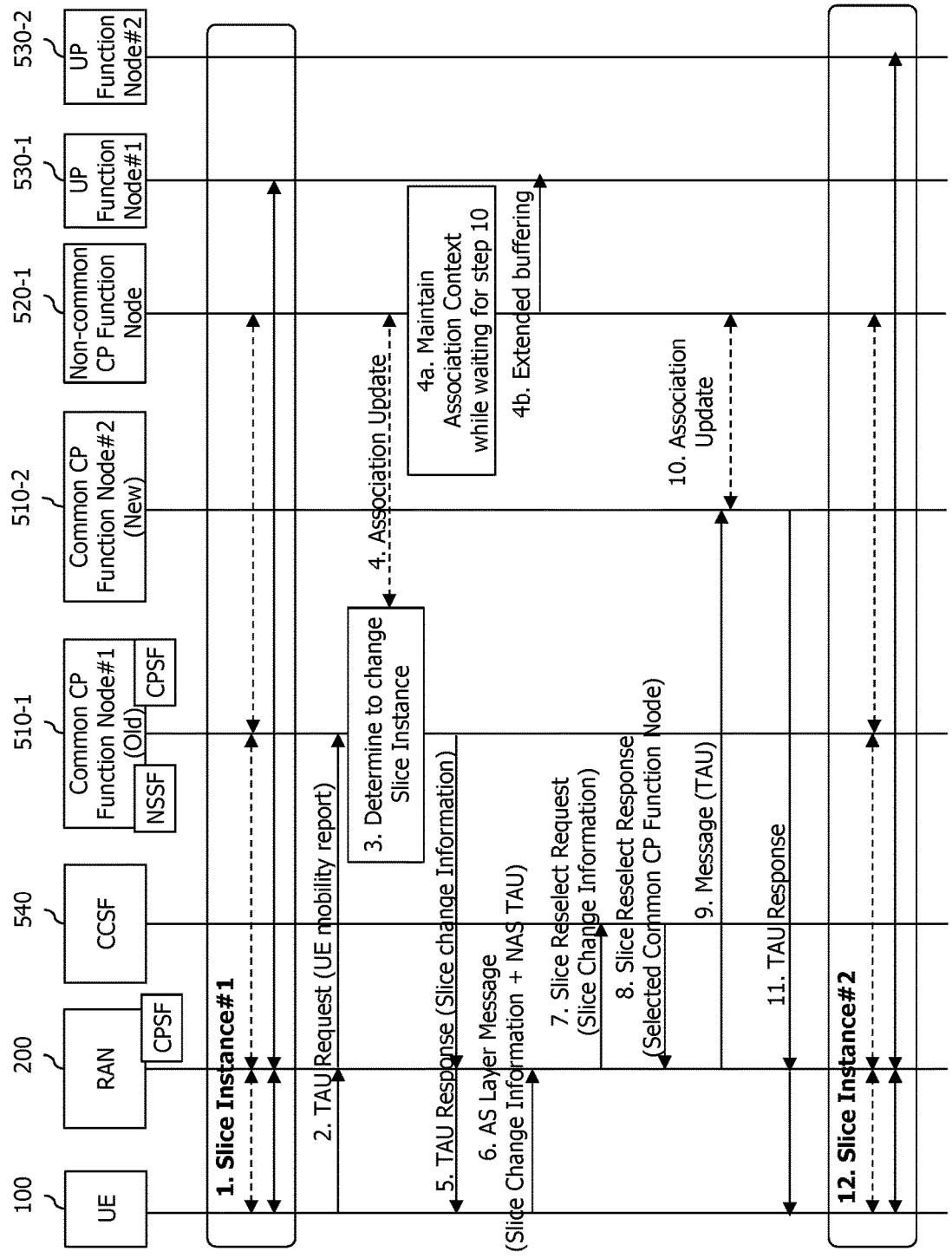
FIG. 8 illustrates a procedure for changing a slice instance under the architecture shown in FIG. 6.

FIG. 8 illustrates a procedure for changing a slice instance under the architecture shown in FIG. 6.

First, to explain the difference from the procedure of FIG. 5, a detach with re-attach operation is performed in the procedure illustrated with reference to FIG. 5 to change a slice instance. If the detach operation is performed, however, a session of the user plane is disconnected, which leads to a disadvantage that service continuity is not guaranteed.

On the other hand, although, in the procedure of FIG. 8, the conventional TAU procedure is performed while the UE is in the idle state, the present proposal improves the TAU procedure so that it may still be performed for changing a slice instance even when the UE is in a connected state. Also, the present proposal maintains association context or induces buffering, thereby minimizing loss of downlink data, which may occur while a slice instance is changed. In what follows, each operating step will be described in more detail.

1) First, the UE 100 performs the attach procedure and the session creation procedure to complete creation of the session #1 of the user plane through the slice instance #1; and transmits and receives data. In other words, a session of the user plane is created among the UE 100, RAN 200, and UP function node #1 530-1. And the control plane is created among the UE 100, RAN 200, common CP function node #1 510-1, and non-common CP function node 520-1.

2) The UE 100 performs location registration again due to the reason such as change of geographic location. To this end, the UE transmits a location update request message, for example, a tracking area update (TAU) request message to the common CP function node #1 510-1 through the RAN 200. At this time, the UE 100 may transmit the TAU request message even though the UE is in the connected state. In other words, while the conventional TAU procedure has been performed only when a UE is in the idle state, the TAU procedure according to the present proposal may be performed even when the UE is in the connected state.

3) The common CP function node #1 510-1 determines whether to change a slice instance to accommodate the changed location on the basis of the subscriber information, provider policy information, and the like.

4) Next, the common CP function node #1 510-1 determines whether a non-common CP function node 520-1 which performs management of the session #1 may be left unchanged even if the slice instance is changed. In the example of FIG. 8, it is assumed that the non-common CP function node 520-1 is not changed. As described above, if the non-common CP function node may be left unchanged, the common CP function node #1 510-1 notifies the non-common CP function node 520-1 of an association update due to the change of the slice instance. Meanwhile, if the non-common CP function node has to be changed, the steps 4 and 10 may not be performed.

The non-common CP function node 520-1 waits for the association context to be received from a new common CP function node as a slice instance is changed and does not remove but retains the context of the UE instead.

And when the UP function node #1 530-1 obtains downlink data to be transmitted to the UE, the non-common CP function node 520-1 transmits a message requesting buffering of the downlink data instead of transmitting a downlink data notification (DDN) message. Or if receiving the DDN message from the UP function node #1 530-1, the non-common CP function node 520-1 requests the buffering.

5) Meanwhile, the common CP function node #1 510-1 transmits a location update response message, namely a TAU response message to the UE in response to a location update request message from the UE 100, namely a tracking area update (TAU) request message. At this time, the common CP function node #1 510-1 includes, within the location update response message (for example, the TAU response message), information indicating that change of a slice instance is needed and information which may be used for selecting a slice instance afterwards.

6) The UE 100 again performs the TAU procedure by using the information within the received message. More specifically, the UE 100 generates a TAU request message of the NAS layer and a message of the AS layer including the information indicating that change of a slice instance is needed; and transmits the generated messages to the RAN 200.

7) The RAN 200 selects a slice instance on the basis of the information included in the message of the AS layer and selects a common CP function node for the corresponding slice instance.

8) Or the RAN 200 may interact with the CCSF 540 for the selection. More specifically, the RAN 200 may transmit a slice reselection request message to the CCSF 540 and receive a slice reselection response message. Since detailed descriptions about the aforementioned operation has already been given with reference to FIG. 7, repeated descriptions will be omitted.

9) Accordingly, if the slice instance #2 and the common CP function node #2 510-2 are selected, the RAN 200 transmits a control message including the TAU request message to the common CP function node #2 510-2.

10) The common CP function node #2 510-2 performs an association update procedure in conjunction with the UP function node #1 530-1. Conventionally, interactions with a node which performs session management are not performed while the TAU procedure, which is a procedure for mobility management, is performed; however, the present proposal improves the common CP function node #2 510-2 to perform the association update procedure in conjunction with the UP function node #1 530-1 for management of downlink data which occur while a slice instance is changed. Meanwhile, to determine whether the common CP function node #2 510-2 has to perform the association update procedure in conjunction with the UP function node #1 530-1, the common CP function node #2 510-2 may consider an explicit indication received from the UE or utilize a message received from the RAN 200 or information received from a separate node.

11) The common CP function node #2 510-2 transmits a TAU response message to the UE 100 through the RAN.

12) By doing so, the UE 100 may transmit and receive data by using the session #2 through the slice instance #2.

As described above, the procedure shown in FIG. 8 maintains association context for a session of the user plane or induces buffering when a UE is in the connected mode, thereby minimizing loss of downlink data, which may occur while a slice instance is changed.

Also, since a UE is also able to recognize change of a slice instance, loss of uplink data may be minimized by temporarily buffering or re-transmitting uplink data to be transmitted.

The architectures described so far may be summarized and compared with each other, as described below.

First, under the architectures shown in FIGS. 2 and 3, the access network (AN) or the radio access network (RAN) provides a direct interface to a CP function node within each slice instance. This kind of architecture provides an advantage that it is less influenced even under a congested situation; however, since the access network (AN) or the radio access network (RAN) has to be aware of all the information about which slice instance is capable of supporting a service of a UE, there arises a drawback that the architecture becomes complicated.

On the other hand, under the architectures shown in FIGS. 4 and 6, the AN or the RAN does not provide a direct interface to a CP function node within each slice instance but has to go through a basic CP function node or a common CP function node to reach the CP function node. This kind of architecture has a drawback that a network slice is not separately completely but provides an advantage that the number of interfaces between the AN or the RAN and the CP function node may be reduced, and architectural complexity may be reduced.

Therefore, the architecture according to the first disclosure shown in FIG. 4 and the architecture according to the second disclosure shown in FIG. 6 may be effective.

Figure 9:
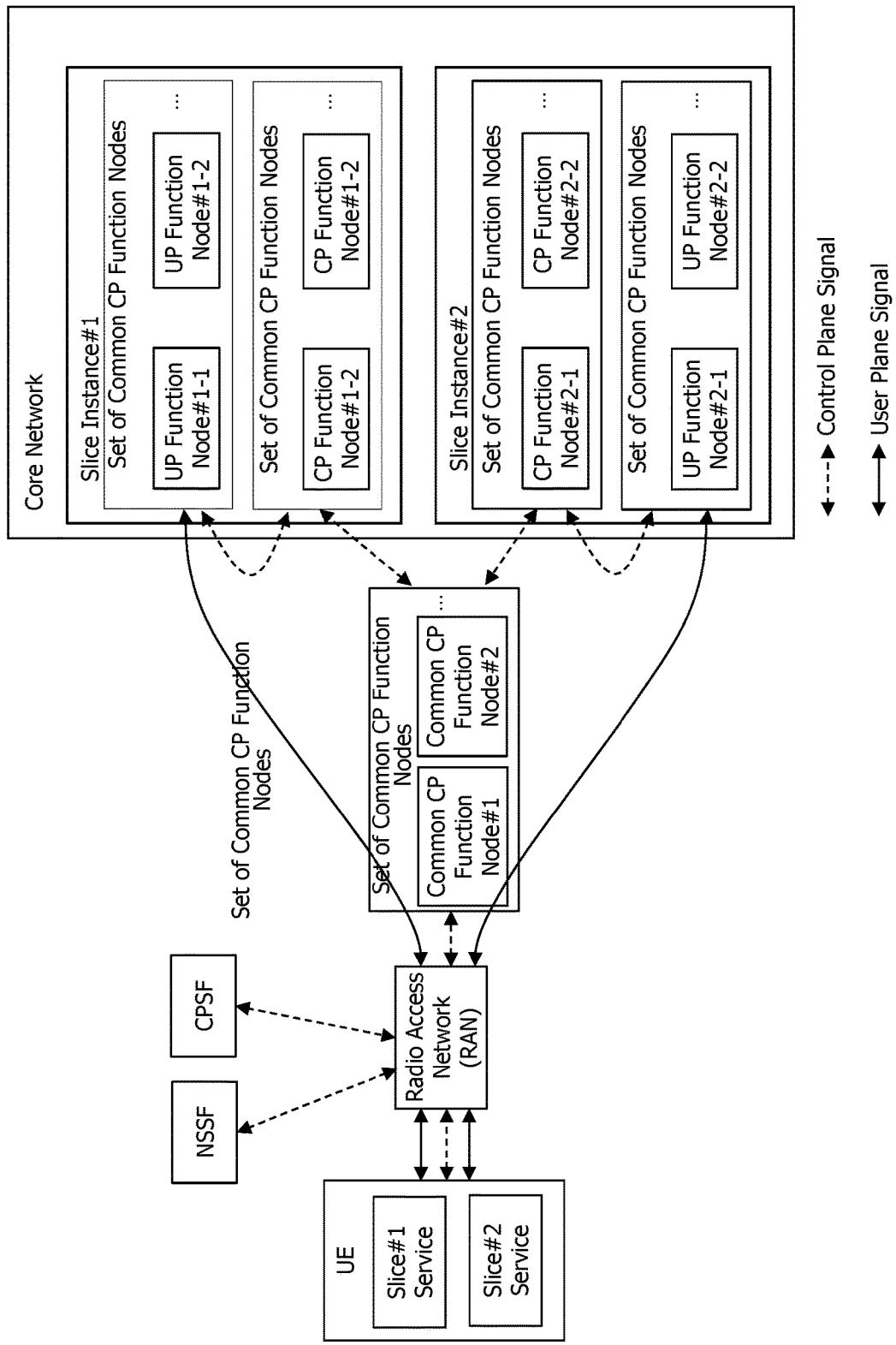
FIG. 9 illustrates the architecture according to the second disclosure of the present specification in a different viewpoint.

FIG. 9 illustrates the architecture according to the second disclosure of the present specification in a different viewpoint.

As shown in FIG. 9, a set of common CP function nodes may include a common CP function node #1 for the slice instance #1 and the common CP function node #2 for the slice instance #2.

The slice instance #1 may include a set of UP function nodes and a set of CP function nodes. In the same manner, the slice instance #2 may include a set of UP function nodes and a set of CP function nodes.

Meanwhile, the network may change the slice instance to which the UE is attached.

To this purpose, the network may determine whether reselection of a slice instance is needed. If reselection is needed, the network may request the UE to perform a detach with re-attach operation or may request re-activation, thereby performing the reselection procedure.

The descriptions above may be implemented by hardware. Hardware implementation will be described with reference to FIG. 10.

Figure 10:
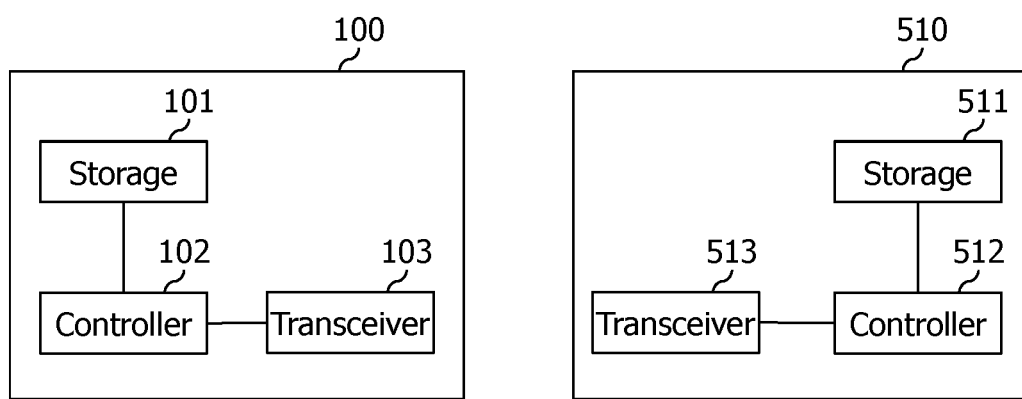
FIG. 10 is a block diagram of a UE 100 and a network node according to an embodiment of the present invention.

FIG. 10 is a block diagram of a UE 100 and a network node according to an embodiment of the present invention.

As shown in FIG. 10, the UE 100 comprises a storage 101, a controller 102, and a transceiver 103. And the network node may be the access network (AN) 200, radio access network (RAN) 200, common CP function node 510, or non-common CP function node 520. The network node may comprise a storage 511, a controller 512, and a transceiver 513.

The storages store the methods described above.

The controllers control the storages and the transceivers. More specifically, the controllers execute the methods stored in the storages. And the controllers transmit the aforementioned signals through the transceivers.

In this document, preferred embodiments of the present invention have been described, but the technical scope of the present invention is not limited only to the specific embodiments. Therefore, the present invention may be modified, changed, or updated in various ways within the technical principles and scope defined by the appended claims.

What is claimed is:

1. A method for processing an access request from a UE, the method performed by a network node and comprising:
    receiving an access request message from a UE;
    selecting a control plane (CP) function node based on information related with the UE, in response to the access request message, wherein the selected CP function node performs a common or basic function, which is shared among slice instances of a network, and wherein each slice instance includes a service-specific or non-common CP function node, which is not shared with other slice instances;
    transmitting the access request message to the selected CP function node;
    transmitting a detach request message to the UE, based on another CP function node being determined as a substitute of the selected CP function node for the UE; and
    receiving a re-attach request message from the UE, wherein the re-attach request message is transmitted from the UE based on change of a slice instance,
    wherein the re-attach request message is received before transmitting the detach request message to the UE.

2. The method of claim 1, wherein the information related with the UE includes one or more of use type information of the UE and information about a type of a service.

3. The method of claim 1, further comprising:
    based on it not being possible to select the CP function node, requesting the selection from a different node.

4. The method of claim 1, wherein the access request message is an attach request message.

5. The method of claim 1, further comprising
receiving a request message including a location update request message from the UE, wherein the location update request message is transmitted from the UE based on a slice instance being changed,
wherein the request message is received before transmitting the detach request message to the UE.

6. The method of claim 5, wherein the location update request message is a Tracking Area Update (TAU) request message or a location registration request message.

7. The method of claim 1, wherein the shared common or basic function includes at least one of (i) a function for performing authentication of the UE, or (ii) a function for managing mobility of the UE.

8. The method of claim 1, wherein the service-specific or non-common CP function node performs a function for managing a session of the UE.

9. A network node configured to process an access request of a UE, the network node comprising:
a transceiver;
at least one processor; and
at least one computer memory operably connectable to the at least one processor and storing instructions that, based on being executed by the at least one processor, perform operations comprising:
receiving, via the transceiver, an access request message from a UE;
selecting a control plane (CP) function node based on information related with the UE, in response to the access request message, wherein the selected CP function node performs a common or basic function, which is shared among slice instances of a network, and wherein each slice instance includes a service-specific or non-common CP function node, which is not shared with other slice instances;
transmitting, via the transceiver, the access request message to the selected CP function node;
transmitting, via the transceiver, a detach request message to the UE, based on another CP function node being determined as a substitute of the selected CP function node for the UE; and
receiving, via the transceiver, a re-attach request message from the UE, wherein the re-attach request message is transmitted from the UE based on a slice instance being changed,
wherein the re-attach request message is received before transmitting the detach request message to the UE.

10. The network node of claim 9, wherein the information related with the UE includes one or more of use type information of the UE and information about a type of a service.

11. The network node of claim 9, wherein the operations further comprise:
based on it not being possible to select the CP function node, requesting the selection from a different node.

12. The network node of claim 9, wherein the operations further comprise:
receiving a request message including a location update request message from the UE, wherein the location update request message is transmitted from the UE based on a slice instance being changed; and
wherein the request message is received before transmitting the detach request message to the UE.

* * * * *